(12) United States Patent
Manhart et al.

(10) Patent No.: US 6,320,651 B1
(45) Date of Patent: Nov. 20, 2001

(54) METHOD AND APPARATUS FOR DETERMINING A VELOCITY

(75) Inventors: Sigmund Manhart, Haar; Elke Schmidt, Oberkochen, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/532,422

(22) Filed: Mar. 23, 2000

(30) Foreign Application Priority Data

Mar. 23, 1999 (DE) .............................................. 199 13 049

(51) Int. Cl.[7] ...................................................... G01P 3/36
(52) U.S. Cl. .............................. 356/28.5; 356/27; 356/28; 356/29; 356/327
(58) Field of Search ............................ 356/27, 28, 28.5, 356/29, 327

(56) References Cited

U.S. PATENT DOCUMENTS

| | | |
|---|---|---|
| 3,528,741 | 9/1970 | Benson et al. . |
| 3,915,572 * | 10/1975 | Orloff ................................. 356/106 |
| 4,988,190 | 1/1991 | Miles . |
| 5,029,999 | 7/1991 | Kremer et al. . |
| 5,088,815 | 2/1992 | Garnier et al. . |
| 5,164,784 * | 11/1992 | Waggoner ........................... 356/28.5 |
| 5,170,218 * | 12/1992 | Keene ................................. 356/28.5 |
| 5,267,010 | 11/1993 | Kremer et al. . |
| 5,500,729 * | 3/1996 | Redman et al. ..................... 356/5.09 |

FOREIGN PATENT DOCUMENTS 4426956    2/1996   (DE) .

OTHER PUBLICATIONS

Applied Optics, vol. 24, No. 15, Aug. 1, 1986, R. Menzies, "Doppler lidar atmosphere wind sensors: a comparative performance evaluation for global measurement applications from earth orbit," pp. 2546–2553.*
"Handbook of Optics", McGraw–Hill, 1978, pp. 8–111 to 8–114 "Polarization Interference Filters".
"Lasermethoden in der Stroemungsmesstechnik", by R. Ruck; pp. 214–215.

* cited by examiner

Primary Examiner—Thomas H. Tarcza
Assistant Examiner—Brian Andrea
(74) Attorney, Agent, or Firm—W. F. Fasse; W. G. Fasse

(57) ABSTRACT

A velocity such as wind velocity is measured based on a Doppler shift of a backscattered or returned laser signal. The Doppler shift of the backscattered beam is determined from a change in the polarization state or intensity shift of the received or backscattered signal after it has passed through a polarization-dispersive element (PD) and through a polarization analyzer (PA). The electrical signals ($I_1$ and $I_2$) generated from two partial beams provided by the polarization analyzer (PA) represent an the intensity shift. The signals are processed in a computer and the resulting information is displayed, for example.

18 Claims, 2 Drawing Sheets

METHOD AND APPARATUS FOR DETERMINING A VELOCITY

This application is based on and claims the priority under 35 U.S.C. §119 of German Patent Application 199 13 049.3, filed on Mar. 23, 1999, the entire disclosure of which is incorporated herein by reference.

INCORPORATION BY REFERENCE

The disclosure of U.S. Pat. No. 3,528,741 (Benson et al.), issued on Sep. 15, 1970; U.S. Pat. No. 4,988,190 (Miles), issued on Jan. 29, 1991; U.S. Pat. No. 5,029,999 (Kremer et al.), issued on Jul. 9, 1991; U.S. Pat. No. 5,088,815 (Garnier et al.), issued on Feb. 18, 1992; and U.S. Pat. No. 5,267,010 (Kremer et al.), issued on Nov. 30, 1993 is incorporated herein by reference

FIELD OF THE INVENTION

The invention relates to a method and apparatus for determining a velocity from a Doppler frequency shift of a relocated or backscattered laser signal.

BACKGROUND INFORMATION

The Doppler lidar method is the classic method for determining velocities by measuring backscattered or reflected laser light. The wind lidar method, for example, detects a laser signal that is backscattered by air molecules or aerosols. If the air molecules or aerosols are moving under the influence of wind, the backscattered or reflected laser signal is frequency-shifted as a function of the wind velocity. The resulting frequency difference or so-called Doppler frequency between the frequency of the emitted or reflected laser signal or radiation and the backscattered signal or radiation is measured and provides a direct measure of the line-of-sight (LOS) velocity of the wind, also known as radial wind velocity.

In the conventional Doppler lidar method the Doppler frequency is measured with the aid of a local oscillator (LO) for example in the form of an auxiliary laser and the LO signal is heterodyned onto the received signal. The resulting beat frequency corresponds to $\Delta\lambda$ or Doppler frequency, which is the basis for determining the wind velocity.

A useful beat signal with this type of coherent detection, however, is generated only when a required coherence condition between the received signal and the LO signal is satisfied, i.e. when a constant phase relationship exists between the two signals. The coherence condition might not be satisfied due to various reasons. For example, it can be disturbed by depolarization or by polarization mismatch of both the emitted and the received signals. Further, the coherence condition may not be satisfied due to wave-front disturbances resulting from a poor quality of the optical components, misalignment (wave-front tilt), or misfocussing (wave-front bending). Interference effects in the backscattered signal by so-called "speckles" can also prevent satisfying the coherence condition. If the coherence condition is not satisfied, the usable signal recedes or diminishes rapidly or even disappears completely. A further disadvantage of the conventional Doppler lidar method is that, the shorter the wavelength, the more difficult it is to satisfy the coherence condition. This is disadvantageous because the backscattering in the atmosphere increases as the wavelength decreases.

Due to the difficulties of satisfying the coherence condition when using short wavelength signals, attempts have been made to replace the coherent detection method with a non-coherent method. One method that has been suggested is the so-called "edge" technique which uses a narrow band optical filter that is so constructed that the original wavelength of the laser lies precisely on the edge of the filter transmission curve. The filter then transmits precisely 50% of the received signal. If the laser frequency of the received beam or signal shifts in one direction, transmission increases; if the laser frequency shifts in the other direction, transmission decreases. The increase or decrease of the transmission indicates the direction and the magnitude of the Doppler frequency shift of the backscattered laser beam, relative to the emitted original laser beam. The wind velocity can then be determined based on the frequency shift.

The "edge" technique, however, runs into great difficulties when put into practice. For example: the filter band width must be extremely narrow in order to provide the desired velocity resolution of approximately 1 m/s in the visible or near infrared range. Moreover, relatively expensive equipment is required in order to precisely tune the filter edge and to provide a consistently stable match of the filter to the laser wavelength. Further, the evaluation and calibration of the absolute value of the filter transmission entail significant difficulties. Yet another drawback of the "edge" technique is that it can be used only with a stationary measuring platform. As soon as the measuring platform moves, the frequency of the backscattered signal shifts relative to or about the velocity of the measuring platform and, under unfavorable conditions, the backscattered signal falls outside the filter transmission curve. Thus, if the measuring platform moves, it is critical that its velocity be known very precisely and that a method be applied that will exactly tune or track the filter curve to the measuring platform velocity. For this reason, the "edge" technique according to the current state of the art appears to be impractical for use in aircraft or satellites.

OBJECTS OF THE INVENTION

In view of the above it is the aim of the invention to achieve the following objects singly or in combination:

- to provide a method and apparatus for measuring velocity that will eliminate the disadvantages of coherent detection methods and of the "edge" filter technology;
- to evaluate the polarization status of the returned laser radiation as a basis for the Doppler shift and respective velocity measurements;
- to avoid the dependency of the velocity measurements on the satisfaction of the above discussed coherence conditions;
- to avoid the effects of signal dissipation due to absorption and destructive interference which are troublesome in conventional optical filter techniques;
- to substantially increase the measuring range and resolution for measuring velocities especially wind velocities; and
- to use a moving platform for mounting the Doppler measuring equipment without the need for any tracking or follow-up adjustments.

SUMMARY OF THE INVENTION

The foregoing objects have been achieved according to the invention by providing a method for determining the Doppler shift, for the purpose of a velocity measurement, of a reflected or backscattered laser signal from a change in the polarization state of the backscattered or received signal.

According to the present method, the change in the polarization state of the received signal, following its passage through a polarization dispersive element, is determined from an intensity shift of two beams of radiation including for example infrared radiation, that are obtained by splitting the received signal and processing the two respective split beam signals in a computer for obtaining the corresponding velocity information based on the Doppler shift.

According to the method of the invention, the backscattered laser beam is first guided through a polarization-dispersive element, e.g. through a birefringent crystal or through a medium that rotates the polarization, and the resulting signals are then analyzed with respect to the polarization state. The deviation of the polarization from the expected polarization value of the original wavelength $\lambda_o$ of the emitted beam or radiation provides a measure for the frequency deviation of the received signal from the emitted signal and thus for the Doppler shift caused by the LOS velocity of the respective reflecting and/or scattering medium. In a practical embodiment the emitted signal SS with the original wavelength $\lambda_0$ is directly passed through the reception channel to function as a reference signal for ascertaining the polarization deviation between the polarization of the backscattered signal ES and the polarization of the reference signal by comparing these polarizations in a computer. The reference signal signifies or represents reflection from a stationary object, while the signal ES is reflected from a moving object.

Basically, with the method of the invention it is necessary to preferably know the polarization state of the reflected or backscattered radiation or beam before it enters into the polarization-dispersive element or medium. Therefore, it is preferable that the returned beam passes first through a polarizer that linearly polarizes the beam with a 45° tilt to the X-axis and to the Y-axis with the beam defining the Z-axis of a three-dimensional coordinate system, before the returned beam or radiation passes into the polarization-dispersive medium. Then the polarization change is measured by a polarization analyzer and the respective electrical signals are processed in a computer. The polarization analyzer is placed in series so to speak with the polarization-dispersive medium.

The apparatus according to the invention for measuring velocity based on the Doppler shift is characterized by a laser for emitting a laser signal, a receiver channel for receiving a return signal backscattered from a moving target, an inlet for said return signal, a polarization dispersive element positioned for receiving said return signal from said input and for receiving a reference signal representing a radiation signal reflected from a stationary target, a polarization responsive analyzer positioned to receive a signal from said polarization dispersive element for providing radiation intensity representing signals, means for converting said radiation intensity representing signals into respective electrical signals, and a computer connected to receive said electrical signals and said reference signal for processing and calculating said velocity based on said Doppler shift.

In an efficient embodiment the reference signal (RS$\lambda_0$) is a signal with the frequency ($\lambda_0$) from the laser L supplied directly without reflection to the receiver channel. However, a beam from the laser (L) reflected from a stationary target for example on the earth, may be used as the reference signal (RS), instead of the directly supplied signal. In all instances the reference signal is a signal that signifies reflection from a stationary object rather than from a moving object as is the case for the signal (ES) that is reflected or backscattered from a moving object such as a mass of moving air.

The method and apparatus of the invention provide several advantages. For example, the detection method no longer requires that the coherence condition is satisfied. Thus, a local oscillator is also not necessary and the requirements for the optical quality of the components and the effort and expense for aligning and focusing the beam are substantially reduced. Furthermore, "speckles" do not result in a loss or dissipation of the signal that is used according to the invention as an intensity shift signal. The full backscattered or reflected laser signal can be used for processing substantially without regard to the magnitude of the wavelength shift, thereby avoiding signal dissipation or loss due to absorption or destructive interference, a difficulty that occurs with all conventional optical filter techniques.

The measurement range available according to the method of the invention is substantially broader than ranges available in conventional methods in which the filter band width or the tuning range of the local oscillator laser limits the measuring range. With the method according to the invention, ambiguities can arise when the frequency or wavelength shifts $\Delta\lambda$ are very large. However, such large $\Delta\lambda$ shifts hardly ever occur in practice and such ambiguities are of no practical concern. In practice, however, such ambiguities are easy to recognize, and easy to correct. The device according to the invention remains fully functional, even when the respective measuring platform is moving, thereby eliminating the necessity for follow-up adjustments or tracking in the present apparatus.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
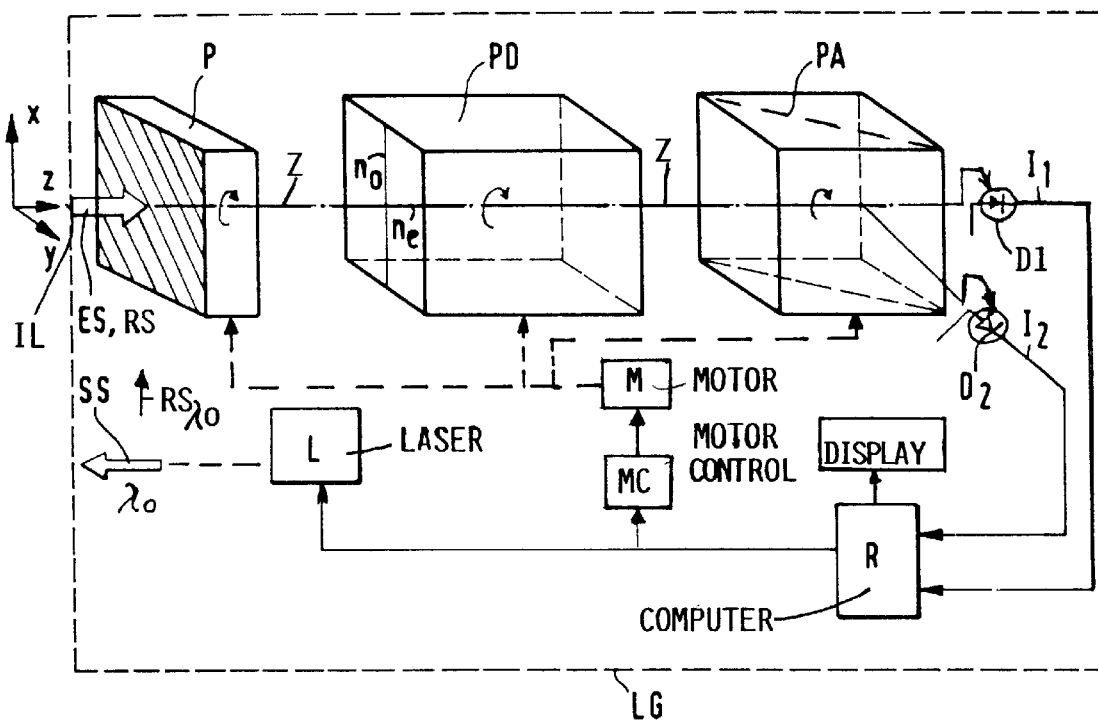
FIG. 1 is a schematic illustration of an embodiment of the velocity measuring apparatus according to the invention, showing a receiving path for a reflected laser beam for example emitted by a lidar unit.

FIG. 1 shows schematically an example embodiment of a velocity measuring apparatus LG by determining the Doppler shift of a backscattered or received laser beam E5, based on a change in the polarization state of the backscattered beam and taking polarization intensity differences into account. A laser beam SS is emitted by a laser L, such as a lidar toward a target. The emitted beam SS has a wavelength $\lambda_0$. When backscattered or reflected from moving objects, such as air molecules or aerosols, the wavelength of the backscattered beam ES is subject to a Doppler shift $\pm\Delta\lambda$. The backscattered beam ES, preferably, but not necessarily, first passes through a polarizer P in the direction of a Z-axis which is oriented in the direction of propagation of the backscattered beam ES. The beam or radiation ES, which enters a optical inlet IL of the apparatus LG, is linearly polarized by the polarizer P at an angle of 45° to an X-axis and to a Y-axis of the X-Y-Z-coordinate system shown in FIG. 1.

A polarization-dispersive element or medium PD is arranged downstream of the polarizer P in the beam receiving path formed in the Z-direction. The polarization-dispersive element or medium PD is, for example, a birefringent crystal, an endface of which is aligned orthogonally to the Z-axis. The crystal axes $n_0$ and $n_e$ of the medium PD or of the element PD are aligned with the X- and Y-axes of the polarizer P, respectively. As mentioned above, the polarization of a beam exiting the polarization-dispersive medium PD is linearly polarized and tilted 45° to the X-axis and to the Y-axis, as it was before it entered the medium PD. The polarization-dispersive medium PD specifically the birefringement crystal is dimensioned so that the phase difference of X- and Y-polarization components of a beam with the wavelength $\lambda_0$ is precisely $\pi$ or a whole number multiple of $\pi$. As a result, the polarization state of such a beam with wavelength $\lambda_0$ exiting the polarization-dispersive medium PD is unchanged and X- and Y-polarization components of the exiting beam or rather the output intensities thereof are of equal magnitude. However, the backscattered beam ES has a wavelength that differs from $\lambda_0$, whereby a different phase shift occurs when the backscattered beam is passing through the crystal PD. In other words, a difference or an unbalance exists between the X- and Y-polarization intensity components of the backscattered beam ES.

A polarization-selective element functioning as a polarization analyzer PA is arranged downstream of the polarization-dispersive medium PD in the beam path, as shown in FIG. 1. In the method and apparatus according to the invention, this polarization analyzer PA is, for example, a polarizing beam splitter that separates the X-polarization from the Y-polarization components to provide respective X- and Y-polarization intensity components. These X- and Y-intensity components are converted by means of photo diodes $D_1$ and $D_2$ into intensity representing electrical signals $I_1$ and $I_2$, whereby $I_1$, provided by $D_1$ relates to the X-direction and $I_2$ provided by $D_2$ relates to the Y-direction. The respective polarization intensity representing signals are then fed to a signal-processing computer R which provides control signals for the system including timing signals for the laser L. The unbalance or difference between $I_1$ and $I_2$ increases proportionally to the magnitude of a wavelength deviation $\Delta\lambda$ with reference to wavelength $\lambda_0$. It is only with very large deviations that the effect reverses, thereby creating ambiguities. However, such very large deviations for $\Delta\lambda$ rarely occur in practice.

The elements PD and PA or the elements P, PD and PA form a receiver path with an optical receiver axis Z which, for example, coincides with the Z-coordinate. A reference signal RS or RS$\lambda_0$ also passes through the receiver path to provide a reference polarization.

Figure 2:
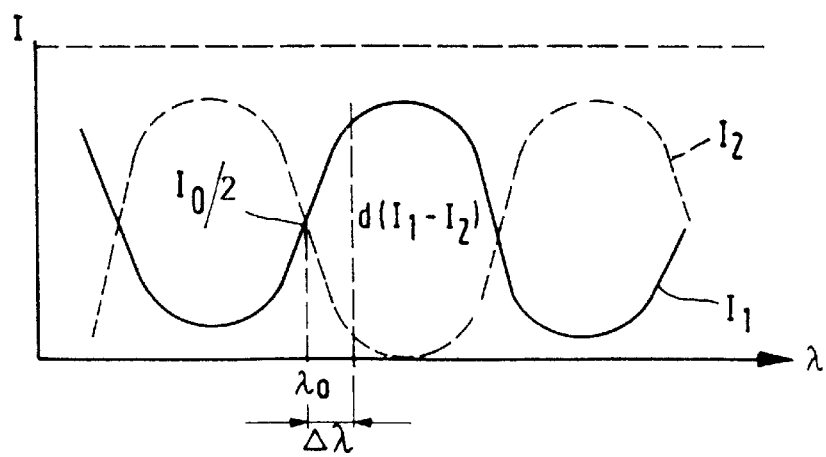
FIG. 2 is a diagram illustrating the curves of the polarization intensity components in the X and Y directions, as a function of the wavelength $\lambda$.

FIG. 2 is a schematic representation of the intensity curves $I_1$ and $I_2$ of the backscattered beam ES for the polarization components in the X- and the Y-direction as a function of the wavelength $\lambda$. The following dependencies or rather relationships exist between the crystal thickness d, the crystal anisotropy $\mu = n_0 - n_e$ and the wavelength of the backscattered beam ES. These relationships are processed in the computer R to determine the output intensities as follows:

$$I_1 = I_0 \sin^2(\pi d\mu/\lambda)$$

$$I_2 = I_0 \cos^2(\pi d\mu/\lambda)$$

The wavelength deviation $\Delta\lambda$ from the initial wavelength $\lambda_0$ of the emitted beam SS is determined from the difference $I_1 - I_2$ of the signal intensities in the X-direction and the Y-direction, or from the relationship $I_1/I_2$. The LOS or radial velocity $v_r$ of the backscattering object can be calculated in turn directly from the wavelength change $\Delta\lambda$ as follows:

$$v_r = c\Delta\lambda/2\lambda_0$$

wherein c is the speed of light.

Following is an example that will illustrate the feasibility of the arrangement for the lidar measurement of wind velocities with a resolution of 1 m/s. Assuming an initial wavelength of $\lambda_0$ for the transmitted beam SS, a certain crystal thickness is required to obtain identical intensities $I_1$ and $I_2$ at the output of the arrangement. Thus:

$$I_1 = I_2 = I_0/2$$

The following equations can be derived from the above mentioned relationship for $I_1$:

$$\sin^2(\pi d\mu/\lambda_0) = \tfrac{1}{2} = I_1$$

or $$\sin(\pi d\mu/\lambda_0) = \pm 1/\sqrt{2}$$

or $$\pi d\mu/\lambda_0 = (2n-1)\pi/4 \text{ with } n = 1, 2, 3 \ldots \text{ (integers)}$$

and thus $$d = (2n-1)\lambda_0/4\mu$$

Substituting into the foregoing equations the values of the wavelength of a Nd:YAG laser, $\lambda_0 = 1.064\ \mu m$, and assuming the use of a birefringent calcite crystal $\mu = n_0 - n_e = 0.1626$, the minimal thickness $d_{min}$ of the crystal is:

$$d_{min} = 1.636 \times 10^{-3} \text{ mm}$$

and an uneven number multiple thereof is:

$$d_n = (2n-1) \times 1.636 \times 10^{-3} \text{ mm}$$

In a practical application a high order for n is recommended, in order to obtain a manageable crystal size on the one hand and a high wavelength resolution on the other hand. The higher the order n, the thicker the crystal, and the greater is the wavelength resolution. Expressed differently, the steepness or slope $dI/d\lambda$ increases with the crystal thickness d according to the following relationship:

$$dI_1/d\lambda = -I_0(\pi d\mu/\lambda_0^2) \text{ in the neighborhood of } \lambda_0$$

The following equations illustrate that with a crystal thickness of d=15.62 cm, a LOS wind velocity of 1 m/s can be measured, if the intensity difference between $I_1$ and $I_2$ is determined precisely to a thousandth, i.e. $d(I_1 - I_2) = 10^{-3} I_0$, which is technically achievable. Thus:

$$d(I_1 - I_2)/d\lambda = 2I_0(\pi d\mu/\lambda_0^2)$$

or $$d(I_1 - I_2)/I_0 = d\lambda/\lambda_0^2 (2\pi d\mu)$$

With a LOS velocity $v_r = 1$ m/s, the Doppler shift $d\lambda/\lambda_0$ is:

$$d\lambda/\lambda_0 = v_r/c = \tfrac{2}{3} \times 10^{-8}$$

and it follows that $$d(I_1 - I_2)/I_0 = 10^{-3} \text{ (with the values given above for } v_r, \lambda_0, d \text{ and } \mu\text{).}$$

For the method according to the invention it is preferred that the polarization state of the backscattered beam ES is precisely known before the beam ES enters the polarization-dispersive element or medium PD to ensure that the polarization analyzer PA analyzes the changes of the beam polarization after it passes through the polarization-dispersive medium PD. Therefore, the polarizer P is positioned between the inlet IL and the element PD in the beam path Z.

Figure 3:
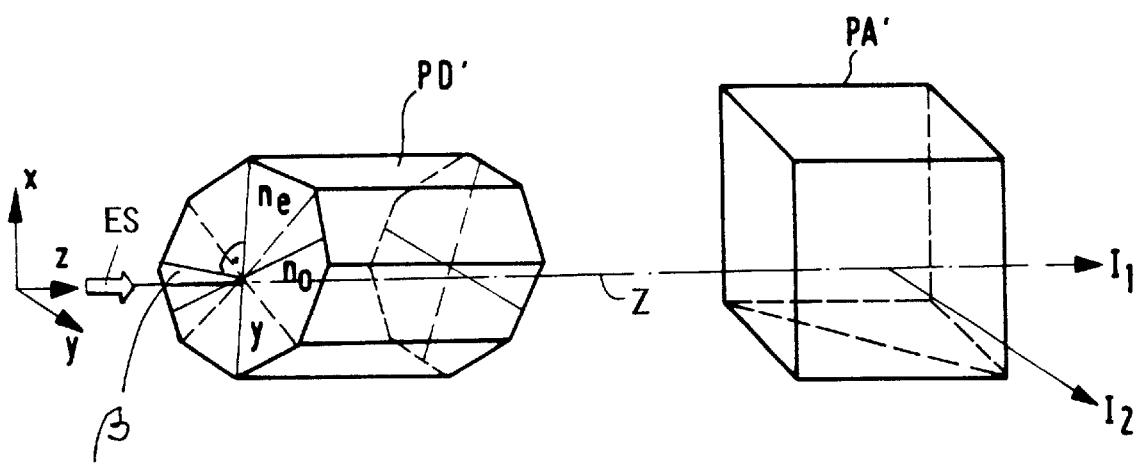
FIG. 3 is a schematic partial illustration of another embodiment of the velocity measuring apparatus according to the invention, showing only the receiving path with a tilted polarization-rotating crystal.

However, the polarizer P may not be necessary as shown in FIG. 3 illustrating another example embodiment, wherein the front face of the crystal of the polarization-dispersive medium or element PD' is tilted relative to the beam axis. The tilt corresponds preferably to the so-called Brewster angle β. The polarizer P in front of or upstream of the polarization-dispersive medium PD' can be eliminated in this arrangement because the tilted element PD' provides the required definite polarization state for the analyzer PA'.

Other example embodiments of the polarization-dispersive biref ringent crystal can include crystals that are assembled of several serially arranged crystal elements, whereby the optical axes of such crystal elements can be rotated relative to one another, for example by a drive motor M controlled by a motor control MC responsive, for example, to a motor control output signal from the computer R which processes the signals $I_1$ and $I_2$. Such crystals are described in the literature on spectral filtering by means of crystal optics, either as the folded-type or the fan-type or also as Evans split element stage. See "Handbook of Optics", McGraw-Hill, 1978, pages 8–112 and 8–113.

The polarization-dispersive birefringent element can also comprise several crystals of the same thickness, whereby the axes $n_0$ and $n_e$ of two serially arranged crystals are rotated 90° relative to each other and a λ/2-plate is inserted between the two crystals. This arrangement is known as a "wide angle element". Such wide angle element serves on the one hand to enlarge the field of vision and, on the other hand, to compensate for an angle dependency of the arrangement.

A simple polarizer that allows passage in only one polarization direction can be used as the polarization analyzer PA, if either the polarization-dispersive crystal PD or the polarizer P rotate about the beam axis in a time controlled sequence in response to a control signal from the computer R which also clocks or time controls the emission of the beam SS by the laser L. The output is then a variable output signal that is a function of the angle of rotation. The angular value representing the minimal or maximal transmission can then be used as the measure for the wavelength.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method for measuring velocity based on the Doppler shift, said method comprising the following steps:
   (a) emitting a laser signal (SS) toward a target,
   (b) receiving a backscattered or reflected signal (ES) from said target,
   (c) passing said backscattered or reflected signal through a polarization dispersive element (PD) for producing a change in a polarization state of said backscattered or reflected signal,
   (d) passing said backscattered or reflected signal through a polarization analyzer (PA) for providing two partial beams representing an intensity shift that signifies said change in said polarization state,
   (e) converting (at $D_1$ and $D_2$) said two partial beams into respective intensity representing electrical signals ($I_1$ and $I_2$), and
   (f) processing said electrical signals ($I_1$ and $I_2$) in a computer for obtaining information regarding said velocity.

2. The method of claim 1, comprising the further step of bringing said backscattered laser signal (ES) into a definite polarization state prior to performing said step of passing said backscattered laser signal (ES) through said polarization dispersive element (PD).

3. The method of claim 2, wherein said further step is performed by first passing said backscattered signal (ES) through a linear polarizer (P) for providing a definite polarization state of said backscattered laser signal (ES) prior to processing.

4. The method of claim 2, wherein said definitive polarization state corresponds to a linear polarization of said backscattered laser signal that is tilted 45° relative to an X-axis and relative to a Y-axis of a rectangular X-, Y-, Z-coordinate system in the Z-axis is the beam propagation axis.

5. The method of claim 1, wherein said processing step comprises evaluating said intensity representing electrical signal ($I_1$ and $I_2$) for obtaining a wavelength difference ($\Delta\lambda$) between a wavelength ($\lambda$) of said emitted laser signal (SS) and a wavelength ($\lambda\pm\Delta\lambda$) of said backscattered signal (ES), and calculating said velocity on the basis of said wavelength difference.

6. The method of claim 1, further comprising also passing a reference signal through said polarization dispersive element (PD) and through said polarization analyzer (PA) for providing a reference polarization and comparing said polarization state of said backscattered or reflected signal with said reference polarization of said reference signal in said computer.

7. The method of claim 6, wherein said laser signal (SS) is passed as said reference signal ($RS\lambda_0$) through said polarization dispersive element (PD) and through said polarization analyzer (PA).

8. The method of claim 6, wherein said reference signal (RS) is a signal reflected from a stationary target.

9. An apparatus for measuring velocity based on the Doppler shift, said apparatus comprising a laser (L) for emitting a laser signal (SS), a receiver channel for receiving a return signal (ES) backscattered from a moving target, an inlet (IL) for said return signal (ES), a polarization dispersive element (PD) positioned for receiving said return signal (ES) from said input and for receiving a reference signal representing a radiation signal reflected from a stationary target, a polarization responsive analyzer (PA) positioned to receive a signal from said polarization dispersive element (PD) for providing radiation intensity representing signals, means ($D_1$ and $D_2$) for converting said radiation intensity representing signals into respective electrical signals ($I_1$ and $I_2$), and a computer (R) connected to receive said electrical signals ($I_1$ and $I_2$) and said reference signal for processing and calculating said velocity based on said Doppler shift.

10. The apparatus of claim 9, wherein said polarization responsive analyzer (PA) is a beam splitter responsive to the polarization of said return signal (ES).

11. The apparatus of claim 9, wherein said polarization dispersive element (PD) is a birefringent crystal.

12. The apparatus of claim 9, wherein said polarization dispersive element (PD) comprises a polarization rotating material.

13. The apparatus of claim 9, further comprising a polarizer (P) operatively interposed between said inlet (IL) and said polarization dispersive element (PD).

14. The apparatus of claim 13, further comprising at least one drive motor (M) operatively connected to any one of said polarizer (P), said polarization dispersive element (PD) and said polarization analyzer (PA) and control means (CM) connected to said drive motor (M) and responsive to said computer (R) for controlling a rotational speed of said drive motor (M).

15. The apparatus of claim 14, further comprising an optical beam axis (Z), wherein each of said polarizer (P), said polarization dispersive element (PD) and said polarization analyzer (PA) has a respective optical axis aligned with said beam axis (Z) for rotation about said beam axis by said drive motor (M).

16. The apparatus of claim 13, comprising a central optical axis (Z) and wherein said inlet (IL), said polarizer (P), said polarization-dispersive element (PD) and said polarization response analyzer (PA) each have an optical axis optically aligned with said central optical axis (Z).

17. The apparatus of claim 9, wherein said polarization dispersive element (PD) has a front face tilted relative to a central optical axis (Z) of said apparatus at a tilt angle.

18. The apparatus of claim 17, wherein said tilt angle corresponds to the Brewster angle.

* * * * *